May 8, 1956    F. B. KRUGER ET AL    2,744,407
INJECTOR TESTING DEVICE

Filed Oct. 24, 1952    2 Sheets-Sheet 1

INVENTORS.
FREDERICK B. KRUGER
RAYMOND H. ROSSOMME &
JOSEPH A. STEIN,
BY J. E. Dickinson
their Attorney.

United States Patent Office 2,744,407
Patented May 8, 1956

2,744,407

INJECTOR TESTING DEVICE

Frederick B. Kruger, Verona, and Raymond H. Rossomme and Joseph A. Stein, Pittsburgh, Pa., assignors to Bacharach Industrial Instrument Company, a corporation of Pennsylvania Application October 24, 1952, Serial No. 316,644

9 Claims. (Cl. 73—49.7)

This invention relates to a test fixture and in particular to a fixture for use in the pressure testing of unit injectors employed for injecting liquid fuel into the cylinders of a Diesel engine.

A unit injector is one which is multi-functional in its nature, the particular units, for example, identified commercially by Series 71 and Series 110 which are manufactured by the General Motors Company perform duties consisting of the metering and injection of fuel, creation of high fuel pressure, atomization and distribution of the fuel and the cooling, lubrication and elimination of air pockets from the injector by reason of the continuous by-pass of fuel therethrough. It is not possible, therefore, to determine by the same test procedures, as applied to conventional fuel atomizing nozzles, whether such a unit injector is serviceable or not. Such units require that a number of steps be taken in checking them for serviceability. During a check test these steps include: Clearing of the unit of bubbles which may become entrained in the oil on admission of the oil into the unit; closing of the outlet connection either by a special valve or a blind when the fuel leak check is made; activating or popping the plunger by a lever to flush the internal parts of the unit; determining the spray pattern of the oil as it issues from the injector nozzle; checking of the opening pressure of the spray valve; checking for leakage of the unit at pressures just below the spray pressure, and checking of the pressure drop within the unit.

By reason of highly organized overhaul procedures, a skilled mechanic can overhaul an injector in ten minutes or less, so that speed and ease in the checking of the functioning of a unit which has been overhauled are prime requisites for carrying out efficiently the test procedure.

A number of testing fixtures have been placed on the market for carrying out the test procedure for checking overhauled units of the type to which reference has been made, but each of such devices is defective in one or more respects so that they are quite inefficient in their use. Some of the units employ screw type connections and, though generally they may be leakproof when secured, they are rather cumbersome as well as difficult and time-consuming to attach to a unit to be tested. Others employ rubber bushings and flexible connecting lines for attaching to the injector but such elements have high wear rates and, particularly when a flexible line is employed in a system in which a pressure-drop measurement is made, results are questionable. Quick-acting connectors are highly desirable and one problem in connection with quick-acting connectors heretofore never satisfactorily solved is created by variations in the height and in the centerline spacing of the inlet and outlet fittings on the injector. In a further type of testing device the pump employed has given very poor performance and the connections used, usually being of the threaded type, have been susceptible to leakage at certain points in the test units, thereby resulting in questionable test data.

The testing device embodying the features of the invention herein disclosed overcomes all of the foregoing disadvantages and is most efficient and accurate in its application for testing unit injectors and checking their serviceability after overhauling. The device includes an assembly consisting of a test oil reservoir, a primer, a pump into which the oil is admitted, a gauge at the pump, an oil line between the pump and a head supported on a frame in which head there are reciprocably supported and separately actuated socket connections into one of which oil passes from the pump and through which it passes to the inlet oil connection of a unit injector being tested, and a gauge in the oil line adjacent the head. The socket connection is cam operated for quickly connecting and disconnecting it to an injector. The remaining socket connection is in like manner operated by a cam for connecting it to and for disconnecting it from the outlet connection of a unit under test. The head is detachable as a unit and it may be replaced readily by one of a different size which is adapted to be used for the testing of a group of injectors of a size different from that of the group previously checked.

One of the objects of this invention is to provide a fixture for testing unit injectors for Diesel engines which employs separately reciprocable sockets for quickly connecting it to and disconnecting it from a unit injector to be tested.

Another object of this invention is to provide a device which is compact in its structure and most efficient in its operation.

Still another object of this invention is to provide a test device having an interchangeable portion which may be quickly substituted for in order to adapt the device for testing unit injectors of a different size.

These objects, as well as the various other novel features and advantages of this invention, will be apparent from the following description and accompanying drawings of which:

Figure 2:
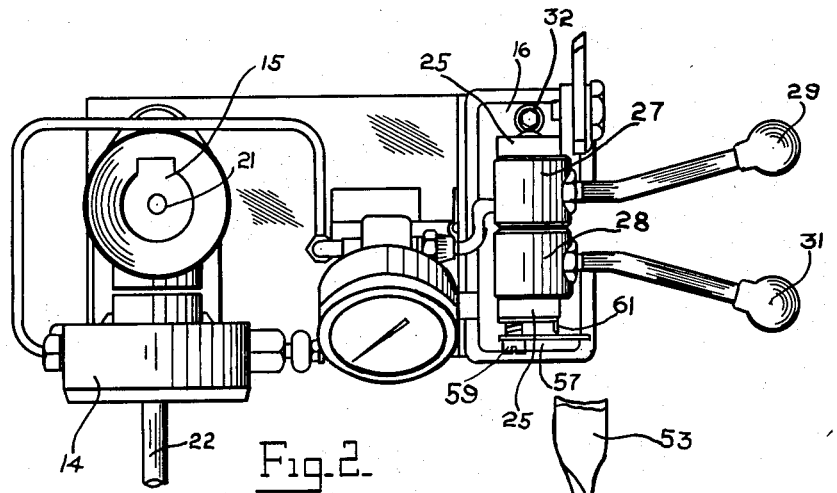
Figure 2 is a plan view of the testing device.
Figure 1:
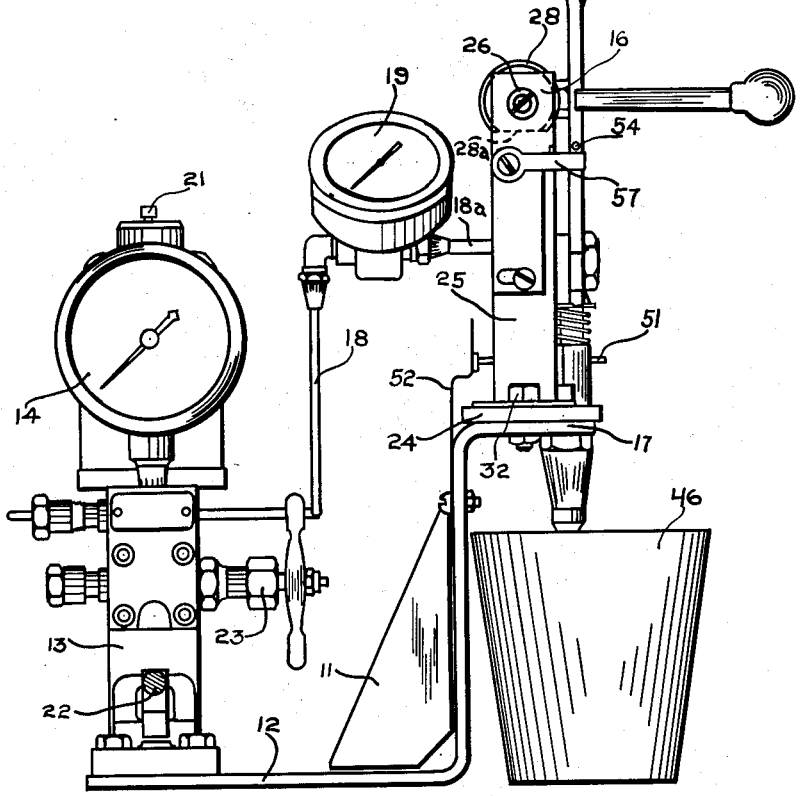
Figure 1 is a front elevation view of a testing device employing features of the invention herein disclosed.

With reference to the drawing Figures 1 and 2, the testing device comprises a Z-frame or stand 11 adapted to be secured to a bench by means of bolts or screws passed through suitable openings in the base 12 thereof, to which frame there are detachably secured a pump 13 having a gauge 14 at the delivery side thereof and an oil cup or reservoir 15 at the low pressure side thereof, a head 16 detachably secured to the upper member 17 of the frame and connected to the pump by a rigid oil line 18, and a pressure gauge 19 secured to a connection 18a and communicating with the head 16. The gauge is adjacent the head 16 in order that it be convenient to the operator when pressures are to be checked during the course of a test.

The pump 13 is a piston type manually operated pump of a type well known in the art and therefore it is considered to be unnecessary to describe the unit in complete detail. There is provided the oil cup 15 having a priming rod 21 passed therethrough which is in communication with the pump adapted to be pressed downward for priming the pump with oil. Although the gauge 14 has been shown in combination with the pump, for determining the serviceability of overhauled unit injectors of the type specifically referred to herein, and for which this testing device is particularly adapted, the gauge 14 is unnecessary and it may be removed and the threaded opening at the top of the pump sealed with a plug. For operating the pump 13, a manually actuated lever 22 is pivotally attached to and extends outward from the bottom portion of the pump. On the delivery side of the pump there is provided a pump shut-off valve 23 which is opened when oil is passed under pressure from the pump to the testing head 16 and which is closed at certain times as, for example, at the instant a pressure drop test is made of a unit injector being checked.

The head 16 is made up of the base 24 to which there are welded two upright posts 25. A shaft 26 is passed through suitable openings in the upper portions of posts 25 and is rigidly secured therein in order to prevent it from turning. Rotatably secured to the shaft there are two cams 27 and 28 provided with flat surfaces 27a and 28a respectively and having manually operable levers 29 and 31 attached thereto respectively for turning them relative to the shaft. The head 16 is fastened to the member 17 by suitable cap screws 32 and is readily detachable as a unit so that when, for example, a change is to be made from the testing of General Motors unit injectors Series 71 to the testing of unit injectors Series 110, all that is necessary is to remove the screws 32, disconnect the gauge connection 18a and remove and replace the entire head 16 with one of the proper size which will accommodate the injector. Thus, a rapid conversion of the device is possible by elimination of extensive dismantling.

Figure 3:
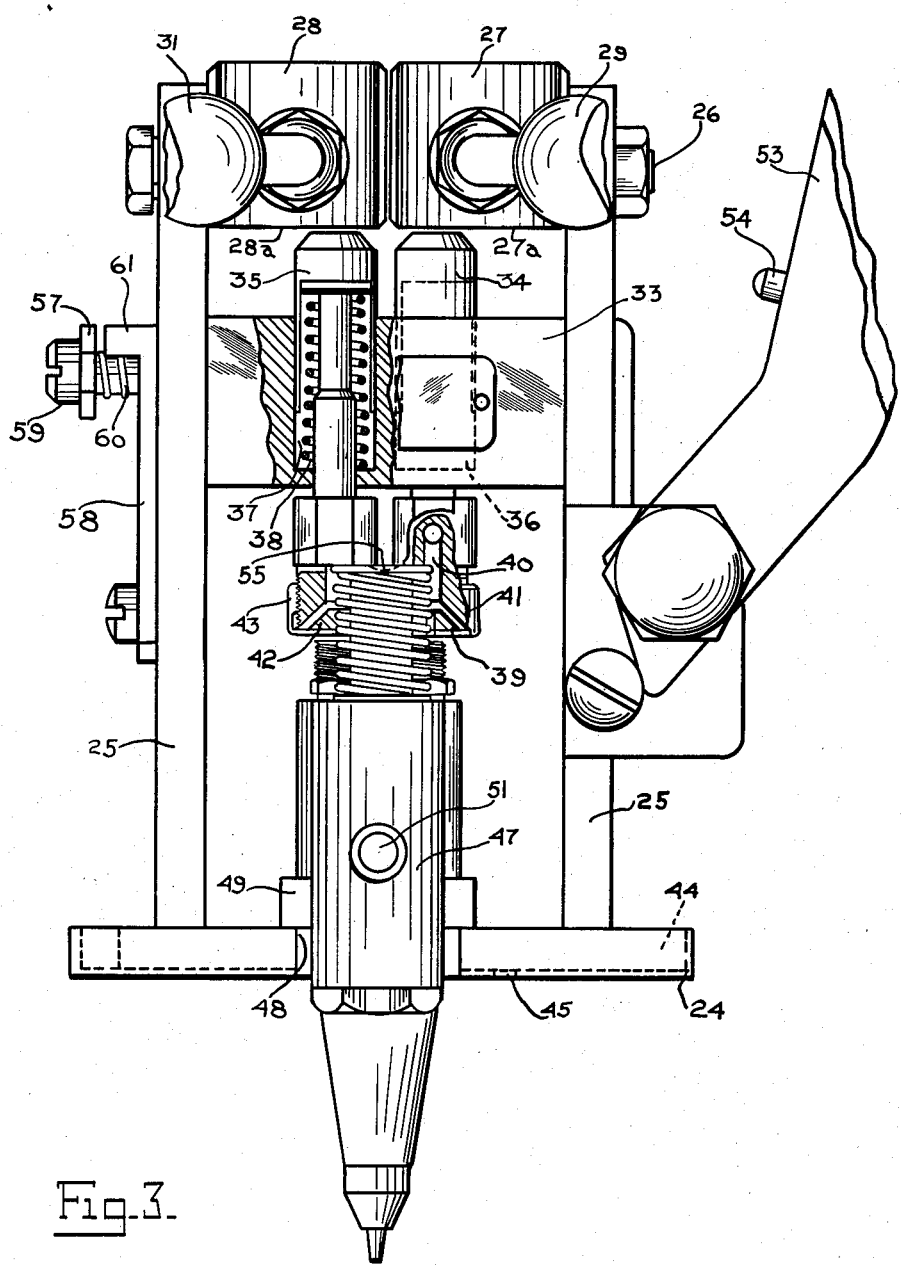
Figure 3 is a partial sectional view of the head of the device.

Beneath the cams as best shown in Figure 3, there is a block 33, welded to the posts 25, having two plungers 34 and 35 slidably supported within chambers 36 and 37 respectively formed in the block. Suitable compression springs 38 encircle each of the plungers for urging them into their upper or retracted positions. The plungers 34 and 35 are located immediately beneath the respective cams 27 and 28 and, as shown in Figure 3, are in their free or open positions. When the plungers are to be depressed downward, the cams are turned separately by operating each of the levers 29 and 31 so as to engage the cams with the ends of the plungers. At the lower end of the plunger 34 there is a replaceable apertured sealing cone type socket or nylon gasket 39 held in place by threaded apertured cap 41 and at the lower end of the plunger 35 there is a replaceable blind sealing cone type socket or nylon gasket 42 held in place by a threaded apertured cap 43. Through the plunger 34 there is a passage 40 which extends from the lower end and through the side thereof which communicates with the fitting of the oil line 18a. The purpose of plunger 35 when depressed is to seal the outlet portion of the injector.

For catching any oil which may drip down from the upper portion of the head 16, there is a trough 44 around the edge of the base 24 which communicates with an opening 45 through the base so that the oil can drain therefrom into a receptacle 46.

As shown in Figure 3, a unit injector 47 to be tested is supported in a cut away portion 48 of the base 24 and member 17 upon a block 49, with the dowel on the underside of the injector being engaged in a slot in the base 24. Prior to the test, the fuel rack 51 of the injector is pushed into its full fuel-on position and retained there by means of a spring clip 52 attached to the side of the Z-frame upright portion.

To one of the posts 25 there is pivotally attached a manually operable lever 53 having a pin 54 secured thereto which is pressed down into engagement with the top of the injector plunger 55 in order to open or "pop" the injector for clearing the passages thereof. On the side of one of the posts 25 a pivotally mounted catch assembly is provided, consisting of a catch 57, a stop bracket 58, a pivot stud 59, a spring 60, and a stop 61 mounted on the bracket 58 for the purpose of holding the lever 53 and thus the injector plunger in such a position that the plunger ports are closed which is necessary in order to conduct the high pressure test.

Operation of the test device may be briefly described as follows:

An overhauled unit injector 47 to be given a serviceability test is placed in the testing device and the fuel rack 51 pushed to the full fuel-on position and locked in place by engaging the rack with the spring clip 52. The cup 15 is filled with oil, the valve 23 opened and the cam lever 29 operated to cause the cam 27 to depress the plunger 34 so that the socket 39 is pressed into sealing engagement with the inlet fitting of the unit injector. There is sufficient flexibility in the line from the head to the pump to permit the slight movement required of the plunger 34 at the head end of the line. The rod 21 is depressed several times to prime the pump and the pump lever 22 operated several times in order to fill with oil the various parts of the device and the unit injector.

As soon as clear oil issues from the outlet connection of the injector, indicating that all of the air has been purged from the system and the injector, the cam lever 31 is operated to engage the cam 28 with and to depress the plunger 35 so that the socket 42 is sealed against the outlet connection of the injector.

In order to clear the injector of foreign matter and to make certain oil is passing therethrough, pressure is applied to the injector and the lever 53 actuated to "pop" open the injector, the sprayed oil being received in the receptacle 46.

To check the pressure at which the spring valve of the injector opens, the pump lever is actuated to build up the oil pressure and the reading noted on the gauge 19 at the instant the injector sprays fuel. The spray pattern, of course, can be studied by carrying out this operation several times.

Leakage of an injector is checked by maintaining the pressure in the unit at a point slightly below the pressure at which the oil spray valve opens and then checking all parts of the unit for oil leaks.

For making the pressure-drop test, oil pressure is applied so that the injector sprays oil readily with an abrupt start and cut-off point. The valve 23 is closed quickly and the drop in pressure noted on the gauge over a predetermined time interval.

In addition to the foregoing, various other tests such as that known as the high pressure test may be readily performed by this testing unit. To make this high pressure test the manually operable lever 53 is pressed down into engagement with the top of the injector plunger 55 then catch 57 is pressed in against spring 60 and at the same time rotated to a stop 61 on stop bracket 58. The injector plunger spring 56 serves to hold the lever 53 firmly against catch 57 which locates plunger in proper position with ports closed off for the high pressure test. Then oil pressure is applied by actuating the pump lever and any signs of oil leakage are observed.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. In a fluid pressure applying device provided with a pressure source for use in determining the serviceability of a unit injector having inlet and outlet fluid connections comprising a frame, a head having a pair of recesses therein and detachably secured to said frame, a pair of plungers yieldably slidable within the recesses in said head and one of which is provided with a passage therethrough, a fluid conductor between said pressure source and the passage in said plunger, a gauge connected to said conductor adjacent said head, a socket having an opening therethrough secured to the end of said last-mentioned plunger, a second socket having a sealing member therein secured to the end of said second plunger, a support on said frame upon which a unit injector may be placed for service testing, and cam means secured to said head operably arranged for engaging said open socket with the inlet connection and for engaging said socket containing the sealing member with the outlet connection of said unit injector.

2. In a fluid pressure applying device provided with a pressure source for use in determining the serviceability of a unit injector having a fuel rack and inlet and outlet fluid connections comprising a frame, a head having a pair of recesses therein and detachably secured to said frame, a pair of members yieldably slidable within the recesses in said head having their lower ends exposed and one of which is provided with an opening therethrough, a fluid conductor between said pressure source and said last-mentioned member, a gauge connected to said conductor adjacent said head, a socket in communication with the opening in said member, a second socket with a sealing member therein secured to the other member, a support on said frame upon which a unit injector may be placed for service testing, means for retaining the fuel rack thereof in full open position, and cam means secured to said head operably arranged for engaging said first-mentioned socket with the inlet connection and for engaging said second-mentioned socket with the outlet connection of said unit injector.

3. In a fluid pressure applying device provided with a pressure source for use in determining the serviceability of a unit injector having inlet and outlet fluid connections comprising a frame, a head having a passage therethrough detachably secured to said frame, a fluid conductor between said pressure source and the passage in said head, a gauge connected to said conductor, a socket slidable within said head and connected to said passage, a sealing member mounted on said head, a support on said frame upon which a unit injector may be placed for service testing, and cam means secured to said head operably arranged for engaging said socket with the inlet connection and for engaging said sealing member with the outlet connection of said unit injector.

4. In a fluid pressure applying device provided with a pressure source for use in determining the serviceability of a unit injector having inlet and outlet connections comprising a frame, a head having a passage therethrough and detachably secured to said frame, a fluid conductor between the pressure source and the passage in said head, a gauge connected to said conductor adjacent said head, a pair of sockets secured to and slidable relative to said head one of which is provided with an aperture therethrough communicating with said passage and the other with a sealing member, a support on said frame upon which a unit injector may be placed for service testing, and cam means secured to said head operably arranged for engaging said apertured socket with the inlet connection and said sealing member of said second socket with the outlet connection of said injector.

5. A fluid pressure applying device for use in testing unit injectors having fluid inlet and outlet connections comprising a frame, a plunger support secured to said frame, a pair of plungers adjacent and arranged to engage the adjacent connections of the injector, and mounted for relative axial movement in recesses in said plunger support, and each provided at its lower end with a socket to engage a fluid connection of an injector, one of said sockets having an opening therethrough, means for connecting a source of fluid under pressure to the opening in said socket last above-mentioned, an injector support attached to said frame for supporting an injector to be tested in alignment with said sockets, and a pair of plunger actuating cams adjustably secured to said frame for moving said plungers and sockets into engagement with the fluid connections of the injector.

6. A fluid pressure applying device according to claim 5 having a lever pivotally attached to said frame for engaging and opening the injector and a releasable latch also secured to the frame for holding said lever in a position to permit high pressure leakage tests of the injector.

7. A fluid pressure applying device for use in testing unit injectors having fluid inlet and outlet connections comprising a frame, a support on said frame upon which an injector to be tested may be mounted, an adapting element adjacent and arranged to engage the adjacent connections of the injector, and adjustably supported in said frame for closing the outlet connection of the injector, a second adapting element adjacent and arranged to engage the adjacent connections of the injector, and also adjustably supported in said frame for connecting the inlet connection of the injector to a source of fluid under pressure, and a separate cam means supported on said frame for independently actuating each of said adapting elements.

8. A fluid pressure device according to claim 7 having replaceable gaskets detachably secured to each of said adapting elements to function as seals when said elements are engaged with the fluid connections of the injector.

9. A fluid pressure device according to claim 7 in which a sectional cone-shaped sealing gasket is detachably secured to each of said adapting elements to function as seals when said elements are engaged with the fluid connections of the injector.

References Cited in the file of this patent

UNITED STATES PATENTS

| | | |
|---|---|---|
| 1,017,704 | Tallman | Feb. 20, 1912 |
| 1,572,158 | Mueller et al. | Feb. 9, 1926 |
| 2,263,803 | Graham | Nov. 25, 1941 |
| 2,517,766 | Cole | Aug. 8, 1950 |
| 2,629,255 | Hartridge | Feb. 24, 1953 |
| 2,689,475 | Blanton | Sept. 21, 1954 |